(12) United States Patent
Goto et al.

(10) Patent No.: US 11,298,687 B2
(45) Date of Patent: *Apr. 12, 2022

(54) HONEYCOMB CATALYTIC CONVERTER

(71) Applicants: IBIDEN CO., LTD., Ogaki (JP); TOYOTA JIDOSHA KABUSHIKI KAISHA, Toyota (JP)

(72) Inventors: Shinnosuke Goto, Ibi-gun (JP); Takumi Tojo, Toyota (JP); Takeru Yoshida, Toyota (JP); Hiromasa Suzuki, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

This patent is subject to a terminal disclaimer.

(21) Appl. No.: 16/830,278

(22) Filed: Mar. 26, 2020

(65) Prior Publication Data
US 2020/0222884 A1 Jul. 16, 2020

Related U.S. Application Data

(63) Continuation of application No. PCT/JP2018/035853, filed on Sep. 27, 2018.

(30) Foreign Application Priority Data

Sep. 27, 2017 (JP) .............................. JP2017-186476

(51) Int. Cl.
*B01J 21/04* (2006.01)
*B01J 21/06* (2006.01)
(Continued)

(52) U.S. Cl.
CPC .............. *B01J 23/63* (2013.01); *B01D 53/94* (2013.01); *B01J 23/002* (2013.01); *B01J 35/04* (2013.01);
(Continued)

(58) Field of Classification Search
CPC ........ B01J 21/04; B01J 21/066; B01J 23/002; B01J 23/44; B01J 23/464; B01J 23/63; B01J 35/04; B01J 23/10; F01N 3/2803
See application file for complete search history.

(56) References Cited

U.S. PATENT DOCUMENTS 5,139,992 A 8/1992 Tauster et al.
5,296,198 A * 3/1994 Abe ...................... F01N 3/0835
422/180

(Continued)

FOREIGN PATENT DOCUMENTS

EP 0559844 9/1993
EP 0798042 10/1997
(Continued)

OTHER PUBLICATIONS

Office Action with Form PTO-892 Notice of References Cited issued by the United States Patent and Trademark Office for the co-pending U.S. Appl. No. 16/830,275, filed Jan. 7, 2021.
(Continued)

*Primary Examiner* — Cam N. Nguyen
(74) *Attorney, Agent, or Firm* — Mori & Ward, LLP

(57) ABSTRACT

The present invention relates to a honeycomb catalytic converter including: a honeycomb structured body in which multiple through-holes are arranged longitudinally in parallel with one another with a partition wall therebetween; a noble metal supported on the honeycomb structured body; and an inlet-side end face and on outlet-side end face, wherein each partition wall includes a substrate portion in the form of an extrudate containing a ceria-zirconia complex oxide and alumina, and a coat layer formed on a surface of the substrate portion and containing the noble metal, and the inlet-side end face has a higher aperture ratio than the outlet-side end face.

18 Claims, 1 Drawing Sheet

(51) Int. Cl.
  *B01J 23/00*  (2006.01)
  *B01J 23/10*  (2006.01)
  *B01J 23/44*  (2006.01)
  *B01J 23/46*  (2006.01)
  *B01J 23/63*  (2006.01)
  *B01J 35/04*  (2006.01)
  *F01N 3/28*  (2006.01)
  *B01D 53/94*  (2006.01)
  *B01J 37/00*  (2006.01)
  *B01J 37/02*  (2006.01)
  *B01J 37/08*  (2006.01)

(52) U.S. Cl.
  CPC ....... *B01J 37/0018* (2013.01); *B01J 37/0225* (2013.01); *B01J 37/0236* (2013.01); *B01J 37/08* (2013.01); *F01N 3/2803* (2013.01); *B01D 2255/1023* (2013.01); *B01D 2255/1025* (2013.01); *B01J 2523/31* (2013.01); *B01J 2523/3712* (2013.01); *B01J 2523/48* (2013.01); *F01N 2330/02* (2013.01); *F01N 2370/02* (2013.01)

(56) References Cited

U.S. PATENT DOCUMENTS

| | | | |
|---|---|---|---|
| 5,318,757 A * | 6/1994 | Abe | F01N 3/2026 422/174 |
| 5,376,610 A * | 12/1994 | Takahata | F01N 13/0097 502/66 |
| 5,459,119 A * | 10/1995 | Abe | B01J 37/0248 502/326 |
| 5,753,580 A | 5/1998 | Hayashi et al. | |
| 5,895,700 A | 4/1999 | Yamada et al. | |
| 6,087,298 A | 7/2000 | Sung et al. | |
| 6,492,297 B1 | 12/2002 | Sung | |
| 6,497,851 B1 | 12/2002 | Hu et al. | |
| 7,731,774 B2 * | 6/2010 | Ohno | F01N 3/0222 55/523 |
| 7,737,077 B2 | 6/2010 | Kitamura et al. | |
| 7,759,283 B2 * | 7/2010 | Yamato | B01D 53/944 502/339 |
| 7,871,452 B2 * | 1/2011 | Yamada | B01J 37/024 55/523 |
| 8,048,382 B2 | 11/2011 | Ohno et al. | |
| 8,071,502 B2 | 12/2011 | Shimizu et al. | |
| 8,207,078 B2 | 6/2012 | Lu et al. | |
| 8,226,898 B2 | 7/2012 | Miwa et al. | |
| 8,323,766 B2 * | 12/2012 | Ido | C04B 37/005 428/116 |
| 8,323,767 B2 * | 12/2012 | Ido | B01J 37/0201 428/116 |
| 8,580,705 B2 * | 11/2013 | Aoki | B01D 53/945 502/304 |
| 8,691,157 B2 * | 4/2014 | Kunieda | B01J 29/88 422/180 |
| 8,796,172 B2 * | 8/2014 | Chinzei | B01J 37/0248 502/327 |
| 8,961,886 B2 * | 2/2015 | Kunieda | B01J 29/88 422/177 |
| 9,266,092 B2 | 2/2016 | Arnold et al. | |
| 9,550,169 B2 * | 1/2017 | Kadota | C04B 38/0006 |
| 9,597,663 B2 | 3/2017 | Inoda et al. | |
| 9,700,842 B2 * | 7/2017 | Miyairi | B01D 46/2459 |
| 10,472,290 B2 * | 11/2019 | Goto | B01D 53/94 |
| 10,507,457 B2 * | 12/2019 | Kadota | C04B 35/50 |
| 10,625,208 B2 | 4/2020 | Bergeal et al. | |
| 10,953,395 B2 * | 3/2021 | Goto | C04B 35/6365 |
| 2004/0001781 A1 | 1/2004 | Kumar et al. | |
| 2008/0081761 A1 | 4/2008 | Suzuki | |
| 2009/0239744 A1 * | 9/2009 | Ohno | C04B 38/0006 502/328 |
| 2009/0246103 A1 * | 10/2009 | Ohno | B01J 37/0009 422/222 |
| 2009/0291826 A1 * | 11/2009 | Ohno | B01D 46/2455 502/64 |
| 2010/0087314 A1 | 4/2010 | Kitamura et al. | |
| 2010/0196221 A1 * | 8/2010 | Ando | B01J 23/42 422/171 |
| 2010/0263357 A1 * | 10/2010 | Lindner | B01J 37/0244 60/299 |
| 2011/0200505 A1 | 8/2011 | Cavataio et al. | |
| 2012/0070346 A1 | 3/2012 | Mizutani et al. | |
| 2013/0011304 A1 * | 1/2013 | Schumann | C04B 35/478 422/168 |
| 2013/0336864 A1 | 12/2013 | Zheng et al. | |
| 2014/0030158 A1 * | 1/2014 | Takagi | B01J 37/031 422/168 |
| 2014/0205523 A1 | 7/2014 | Arnold et al. | |
| 2015/0209726 A1 * | 7/2015 | Difrancesco | B01D 53/8628 422/180 |
| 2015/0375206 A1 | 12/2015 | Aoki | |
| 2016/0074800 A1 * | 3/2016 | Ito | B01D 46/2418 428/117 |
| 2017/0306823 A1 | 10/2017 | Onoe et al. | |
| 2018/0015411 A1 * | 1/2018 | Onoe | B01D 53/94 |
| 2018/0229183 A1 | 8/2018 | Kadota et al. | |
| 2019/0136730 A1 * | 5/2019 | Onozuka | B01J 37/0234 |
| 2019/0143312 A1 * | 5/2019 | Goto | C04B 35/6268 502/304 |
| 2019/0144342 A1 * | 5/2019 | Goto | B01D 53/94 422/180 |

FOREIGN PATENT DOCUMENTS

| | | |
|---|---|---|
| EP | 2130600 | 12/2009 |
| EP | 2556871 | 2/2013 |
| GB | 2558186 | 7/2018 |
| JP | 62-068543 | 3/1987 |
| JP | 07-060117 | 3/1995 |
| JP | 10-296085 | 11/1998 |
| JP | 2002-210371 | 7/2002 |
| JP | 2004-066069 | 3/2004 |
| JP | 2005-530614 | 10/2005 |
| JP | 2006-188404 | 7/2006 |
| JP | 2006-205050 | 8/2006 |
| JP | 2009-011937 | 1/2009 |
| JP | 2009-255032 | 11/2009 |
| JP | 2009-273988 | 11/2009 |
| JP | 2010-127210 | 6/2010 |
| JP | 2012-040547 | 3/2012 |
| JP | 2013-522020 | 6/2013 |
| JP | 2014-147858 | 8/2014 |
| JP | 2014-151306 | 8/2014 |
| JP | 2015-085241 | 5/2015 |
| JP | 2016-505380 | 2/2016 |
| JP | 2016-123890 | 7/2016 |
| JP | 2016-131968 | 7/2016 |
| JP | 2017-006827 | 1/2017 |
| JP | 2017-039069 | 2/2017 |
| WO | WO 2004/002621 | 1/2004 |
| WO | WO 2011/125766 | 10/2011 |
| WO | WO 2014/116897 | 7/2014 |
| WO | WO 2016/060048 | 4/2016 |

OTHER PUBLICATIONS

Office Action with Form PTO-892 Notice of References Cited issued by the United States Patent and Trademark Office for the co-pending U.S. Appl. No. 16/830,277, filed Jan. 7, 2021.

Office Action with Form PTO-892 Notice of References Cited issued by the United States Patent and Trademark Office for the co-pending U.S. Appl. No. 16/830,275, filed Jul. 19, 2021.

Office Action with Form PTO-892 Notice of References Cited issued by the United States Patent and Trademark Office for the co-pending U.S. Appl. No. 16/830,277, filed Aug. 4, 2021.

Office Action with Form PTO-892 Notice of References Cited issued by the United States Patent and Trademark Office for the co-pending U.S. Appl. No. 16/830,272, filed Aug. 31, 2021.

(56) References Cited

OTHER PUBLICATIONS

Office Action with Form PTO-892 Notice of References Cited issued by the United States Patent and Trademark Office for the co-pending U.S. Appl. No. 16/830,276, filed Aug. 31, 2021.
Advisory Action issued by the U.S. Patent and Trademark Office for the co-pending U.S. Appl. No. 16/830,275, filed Nov. 19, 2021.
Notice of Allowance issued by the United States Patent and Trademark Office for the co-pending U.S. Appl. No. 16/830,272, filed Dec. 13, 2021.
Notice of Allowance issued by the United States Patent and Trademark Office for the co-pending U.S. Appl. No. 16/830,276, filed Dec. 13, 2021.
Advisory Action issued by the U.S. Patent and Trademark Office for the co-pending U.S. Appl. No. 16/830,277, filed Dec. 15, 2021.
Office Action with Form PTO-892 Notice of References Cited issued by the United States Patent and Trademark Office for the co-pending U.S. Appl. No. 16/830,279, filed Feb. 3, 2022.

\* cited by examiner

HONEYCOMB CATALYTIC CONVERTER

TECHNICAL FIELD

The present invention relates to a honeycomb catalytic converter.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating the slurry containing noble metal particles having catalytic activity on a honeycomb monolithic substrate made of cordierite or the like.

Patent Literature 1 discloses an exhaust gas catalytic converter including a Pd-carrying porous substrate and a Rh-carrying coat layer made of a ceria-zirconia solid solution on the porous substrate.

CITATION LIST

Patent Literature

Patent Literature 1: JP 2017-39069 A

SUMMARY OF INVENTION

Technical Problem

Still, there is a demand for a honeycomb catalytic converter that exhibits higher exhaust gas conversion performance than the exhaust gas catalytic converter disclosed in Patent Literature 1.

As a result of extensive studies on the exhaust gas catalytic converter disclosed in Patent Literature 1, the present inventors found that, in the exhaust gas catalytic converter disclosed in Patent Literature 1, the pressure loss is high due to resistance that occurs when exhaust gas flows into the partition walls and frictional resistance that occurs between the exhaust gas passing through the through-holes and the partition walls. The reason is presumably due to a low aperture ratio (particularly, the aperture ratio on the inlet-side end face) of the exhaust gas catalytic converter resulting from the formation of the coat layer on the surface of the porous substrate.

The present invention was made to solve the above problem. An object of the present invention is to provide a honeycomb catalytic converter having low pressure loss and excellent exhaust gas conversion performance.

Solution to Problem

Specifically, the present invention provides a honeycomb catalytic converter including: a honeycomb structured body in which multiple through-holes are arranged longitudinally in parallel with one another with a partition wall therebetween; a noble metal supported on the honeycomb structured body; and an inlet-side end face and on outlet-side end face, wherein each partition wall includes a substrate portion in the form of an extrudate containing a ceria-zirconia complex oxide and alumina, and a coat layer formed on a surface of the substrate portion and containing the noble metal, and the inlet-side end face has a higher aperture ratio than the outlet-side end face.

In the honeycomb catalytic converter of the present invention, the inlet-side end face has a higher aperture ratio than the outlet-side end face. Thus, the resistance that occurs when exhaust gas is introduced into the honeycomb catalytic converter is small. In addition, when exhaust gas passes through the through-holes, the frictional resistance gradually increases from the inlet-side end face toward the outlet-side end face. Thus, the exhaust gas passing through the through-holes is sequentially dispersed into the partition walls of the honeycomb catalytic converter, and the partition walls from the inlet-side end face to the outlet-side end face are evenly used for exhaust gas conversion. In contrast, when the inlet-side end face has a lower aperture ratio than the outlet-side end face (i.e., the relationship of the aperture ratio is inverted), exhaust gas is not easily dispersed into the partition walls at the outlet-side end face where the pressure is low, so that the catalyst in the partition walls cannot be sufficiently used for exhaust gas conversion. Because of the above reasons, the honeycomb catalytic converter of the present invention can achieve low pressure loss and improves exhaust gas conversion performance.

In the honeycomb catalytic converter of the present invention, preferably, the coat layers are thicker on the outlet-side end face than on the inlet-side end face.

When the coat layers are thicker on the outlet-side end face than on the inlet-side end face, the inlet-side end face can have a higher aperture ratio than the outlet-side end face, without changing the thickness of the substrate portions in the form of an extrudate.

In the honeycomb catalytic converter of the present invention, preferably, the thickness of each coat layer successively increases from the inlet-side end face toward the outlet-side end face.

When the thickness of each coat layers successively increases from the inlet-side end face to the outlet-side end face, the flow of exhaust gas passing through the honeycomb catalytic converter is less likely to be disturbed, so that the resistance between the exhaust gas and the honeycomb catalytic converter can be kept low.

In the honeycomb catalytic converter of the present invention, preferably, the inlet-side end face has an aperture ratio of 70 to 90%, and the outlet-side end face has an aperture ratio of 65 to 85%.

When the inlet-side end face and the outlet-side end face have aperture ratios in the above ranges, the honeycomb catalytic converter can exhibit sufficient exhaust gas conversion performance while the required flow rate of exhaust gas is ensured.

When the aperture ratio of the inlet-side end face is higher than 90%, the partition walls are so thin and thus easily breakable. When the aperture ratio of the inlet-side end face is lower than 70%, the pressure loss becomes too high.

When the aperture ratio of the outlet-side end face is higher than 85%, the partition walls are too thin and thus easily breakable. When the aperture ratio of the outlet-side end face is lower than 65%, the pressure loss becomes too high.

In the honeycomb catalytic converter of the present invention, preferably, the substrate portion further contains an inorganic binder.

When the substrate portion further contains an inorganic binder, the mechanical strength of the partition walls can be increased.

Preferably, the honeycomb catalytic converter of the present invention has a length to diameter ratio (length/diameter) of 0.5 to 1.1.

The honeycomb catalytic converter having a shape with a length to diameter ratio in the above range can easily achieve the required exhaust gas conversion performance while the pressure loss in the honeycomb catalytic converter is kept low.

In the honeycomb catalytic converter of the present invention, preferably, the honeycomb catalytic converter has a diameter of 130 mm or less.

The honeycomb catalytic converter having a diameter of 130 mm or less can be made less susceptible to breakage from thermal shock.

Preferably, the honeycomb catalytic converter of the present invention contains 25 to 75 wt % ceria-zirconia complex oxide.

When the proportion of ceria-zirconia complex oxide is in the above range, the honeycomb catalytic converter can have a higher oxygen storage capacity (OSC).

DESCRIPTION OF EMBODIMENTS

[Honeycomb Catalytic Converter]

First, the honeycomb catalytic converter of the present invention is described.

The honeycomb catalytic converter of the present invention includes a honeycomb structured body in which multiple through-holes are arranged longitudinally in parallel with one another with a partition wall therebetween, and a noble metal supported on the honeycomb structured body.

In the honeycomb catalytic converter of the present invention, the honeycomb structured body contains a ceria-zirconia complex oxide (hereinafter also referred to as "CZ") and alumina.

Whether or not the honeycomb catalytic converter of the present invention contains the above components can be confirmed by X-ray diffraction (XRD).

In the honeycomb catalytic converter of the present invention, the partition walls constituting the honeycomb structured body each include a substrate portion in the form of an extrudate containing ceria-zirconia complex oxide particles (hereinafter also referred to as "CZ particles) and alumina particles, and a coat layer formed on a surface of the substrate portion and containing a noble metal.

In the honeycomb catalytic converter of the present invention, the inlet-side end face has a higher aperture ratio than the outlet-side end face.

When the inlet-side end face has a higher aperture ratio than the outlet-side end face, the resistance that occurs when exhaust gas is introduced into the honeycomb catalytic converter is small. When exhaust gas passes through the through-holes, the frictional resistance gradually increases from the inlet-side end face toward the outlet-side end face. Thus, the exhaust gas passing through the through-holes is sequentially dispersed into the partition walls of the honeycomb catalytic converter, and the partition walls from the inlet-side end face to the outlet-side end face are evenly used for exhaust gas conversion. In contrast, when the inlet-side end face has a lower aperture ratio than the outlet-side end face (i.e., the relationship of the aperture ratio is inverted), exhaust gas is not easily dispersed into the partition walls at the outlet-side end face where the pressure is low, so that the catalyst in the partition walls cannot be sufficiently used for exhaust gas conversion. Because of the above reasons, the honeycomb catalytic converter of the present invention can achieve low pressure loss and improves exhaust gas conversion performance.

Figure 1A:
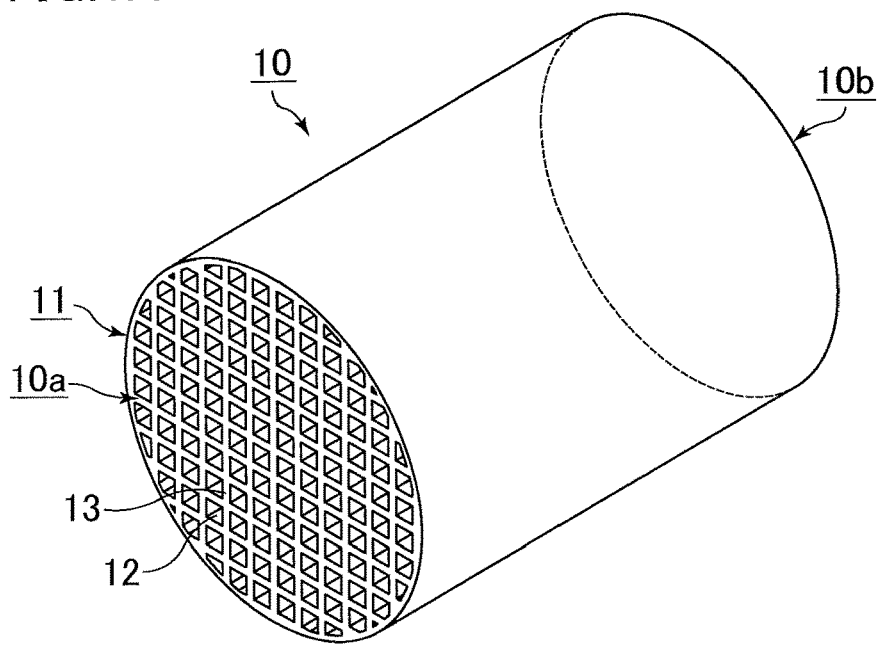
FIG. 1A is a schematic perspective view of an example of a honeycomb catalytic converter of the present invention.
Figure 1B:
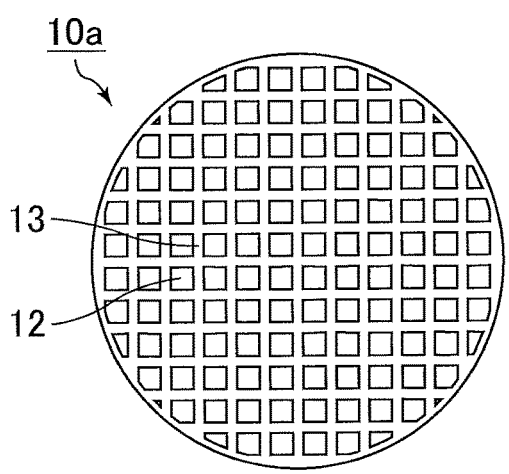
FIG. 1B is a front view of the honeycomb catalytic converter in FIG. 1A.
Figure 1C:
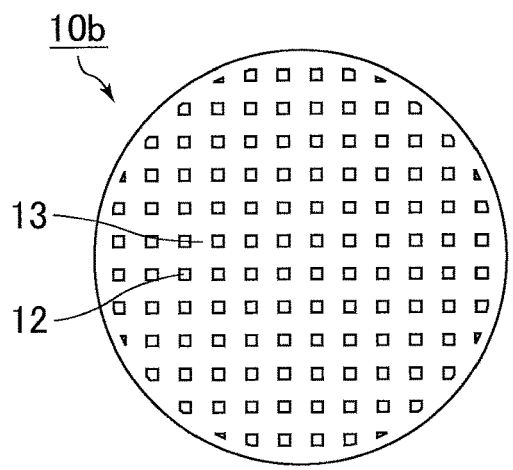
FIG. 1C is a back view of the honeycomb catalytic converter in FIG. 1A.

FIG. 1A is a schematic perspective view of an example of the honeycomb catalytic converter of the present invention. FIG. 1B is a front view of the honeycomb catalytic converter in FIG. 1A. FIG. 1C is a back view of the honeycomb catalytic converter in FIG. 1A.

A honeycomb catalytic converter 10 shown in FIG. 1A includes a single honeycomb structured body 11 in which multiple through-holes 12 are arranged longitudinally in parallel with one another with a partition wall 13 therebetween. The honeycomb structured body 11 contains CZ and alumina, and carries a noble metal. As shown in FIG. 1B and FIG. 1C, the opening area of each through-hole (12) on an inlet-side end face 10a of the honeycomb catalytic converter 10 is larger than the opening area of each through-hole (12) on an outlet-side end face 10b. Thus, inlet-side end face 10a of the honeycomb catalytic converter 10 has a higher aperture ratio than the outlet-side end face 10b. The aperture ratio of the honeycomb catalytic converter 10 shown in FIG. 1B and FIG. 1C does not reflect the actual aperture ratio of the honeycomb catalytic converter of the present invention.

Figure 2:
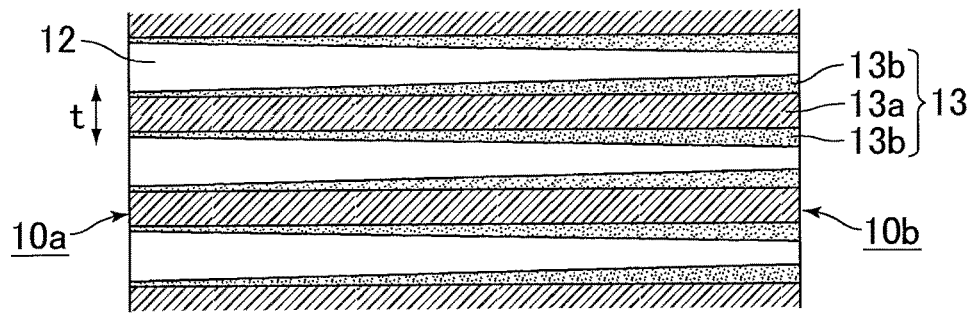
FIG. 2 is a schematic cross-sectional view of the honeycomb catalytic converter of the present invention.

FIG. 2 is a schematic cross-sectional view of an example of the honeycomb catalytic converter of the present invention.

As shown in FIG. 2, the partition walls 13 constituting the honeycomb catalytic converter 10 each include a substrate portion 13a and a coat layer 13b containing a noble metal. The substrate portion 13a is in the form of an extrudate containing a ceria-zirconia complex oxide and alumina, and the thickness (the length in the direction indicated by the double-headed arrow "t" in FIG. 2) is the same between the inlet-side end face 10a and the outlet-side end face 10b.

In contrast, the thickness of the coat layer 13b formed on the surface of each substrate portion 13a successively increases from the inlet-side end face 10a toward the outlet-side end face 10b.

As a result, as shown in FIG. 1A and FIG. 1B, the inlet-side end face 10a has a higher aperture ratio than the outlet-side end face 10b.

In the honeycomb catalytic converter of the present invention, preferably, the inlet-side end face has an aperture ratio of 70 to 90%, and the outlet-side end face has an aperture ratio of 65 to 85%.

When the inlet-side end face and the outlet-side end face have aperture ratios in the above ranges, the honeycomb catalytic converter can exhibit sufficient exhaust gas conversion performance while the required flow rate of exhaust gas is ensured.

When the aperture ratio of the inlet-side end face is higher than 90%, the partition walls are so thin and thus easily breakable. When the aperture ratio of the inlet-side end face is lower than 70%, the pressure loss becomes too high.

When the aperture ratio of the outlet-side end face is higher than 85%, the partition walls are too thin and thus easily breakable. When the aperture ratio of the outlet-side end face is lower than 65%, the pressure loss becomes too high.

In the honeycomb catalytic converter of the present invention, preferably, the difference in the aperture ratio between the inlet-side end face and the outlet-side end face is 5 to 15%.

The honeycomb catalytic converter of the present invention may include a single honeycomb fired body or multiple honeycomb fired bodies, and the multiple honeycomb fired bodies may be combined together with an adhesive layer.

The honeycomb catalytic converter of the present invention may include a peripheral coat layer on the outer periphery of the honeycomb fired body.

In order to increase thermal shock resistance, preferably, CZ particles contained in the honeycomb catalytic converter of the present invention have an average particle size of 1 to 50 μm. The average particle size of the CZ particles is more preferably 1 to 30 μm.

When the CZ particles have an average particle size of 1 to 50 μm, the resulting honeycomb catalytic converter has a larger surface area, thus achieving a higher OSC.

The alumina particles contained in the honeycomb catalytic converter of the present invention may have any average particle size. Yet, in order to increase exhaust gas conversion performance, the average particle size is preferably 1 to 10 μm, more preferably 1 to 5 μm.

The average particle sizes of the CZ particles and alumina particles contained in the honeycomb catalytic converter can be determined by taking a scanning electron microscope (SEM) image of the honeycomb catalytic converter with a SEM (S-4800 available from Hitachi High-Technologies Corporation).

Preferably, the honeycomb catalytic converter of the present invention contains 25 to 75 wt % ceria-zirconia complex oxide.

When the proportion of the ceria-zirconia composite oxide is set in the above range, the honeycomb catalytic converter can have a higher OSC.

Preferably, the honeycomb catalytic converter of the present invention contains 15 to 35 wt % alumina particles.

In the honeycomb catalytic converter of the present invention, ceria in the ceria-zirconia complex oxide of the CZ particles has an OSC. The ceria-zirconia complex oxide preferably forms a solid solution of ceria and zirconia.

In the honeycomb catalytic converter of the present invention, the amount of ceria in the ceria-zirconia complex oxide is preferably 30 wt % or more, more preferably 40 wt % or more, and preferably 90 wt % or less, more preferably 80 wt % or less. The amount of zirconia in the ceria-zirconia complex oxide is preferably 60 wt % or less, more preferably 50 wt % or less. Such a ceria-zirconia complex oxide has a high ceria content and thus has a high OSC.

In the honeycomb catalytic converter of the present invention, the alumina particles may be of any type, but θ-phase alumina particles (hereinafter also referred to as "θ-alumina particles") are preferred.

Use of θ-phase alumina particles as dividers for the ceria-zirconia complex oxide can inhibit sintering of alumina particles to one another by heat during use, allowing for sustained catalytic function. Further, use of θ-phase alumina particles can increase heat resistance.

The honeycomb catalytic converter of the present invention preferably contains inorganic particles used as an inorganic binder during the production, and more preferably contains γ-alumina particles derived from boehmite.

The honeycomb catalytic converter of the present invention preferably contains inorganic fibers, more preferably alumina fibers.

The honeycomb catalytic converter containing inorganic fibers such as alumina fibers can have better mechanical characteristics.

The inorganic fibers are those having an aspect ratio of 5 or more, and the inorganic particles are those having an aspect ratio of less than 5.

The honeycomb catalytic converter of the present invention preferably has a length to diameter ratio (length/diameter) of 0.5 to 1.1, more preferably 0.6 to 0.8.

In the honeycomb catalytic converter of the present invention, the diameter of the honeycomb catalytic converter is preferably 130 mm or less, more preferably 125 mm or less. The diameter of the honeycomb catalytic converter is also preferably 85 mm or more.

In the honeycomb catalytic converter of the present invention, the length of the honeycomb catalytic converter is preferably 65 to 120 mm, more preferably 70 to 110 mm.

The shape of the honeycomb catalytic converter of the present invention is not limited to a round pillar shape. Examples include a prism, a cylindroid shape, a pillar shape having an end face with a racetrack shape, and a prism with rounded corners (e.g., a triangular pillar shape with rounded corners).

In the honeycomb catalytic converter of the present invention, preferably, the substrate portions defining the partition walls have a uniform thickness. Specifically, the thickness of each substrate portion is preferably 0.05 to 0.25 mm, more preferably 0.10 to 0.15 mm.

In the honeycomb catalytic converter of the present invention, preferably, the coat layers each has a thickness of 0 to 0.025 mm on one side on the inlet-side end face, and a thickness of 0.025 to 0.075 mm on one side on the outlet-side end face. The average thickness is preferably 0.01 to 0.05 mm on one side.

The average thickness of the coat layers is determined by averaging the thickness of the coat layers on the inlet-side end face, the thickness of the coat layers on the outlet-side end face, and the thickness of the coat layers on a cross section obtained by cutting the honeycomb catalytic converter at a position one-half the length in the longitudinal direction. The thickness of the coat layers on each of the end faces and the cross section is the average thickness of the coat layers at randomly selected 10 positions.

In the honeycomb catalytic converter of the present invention, preferably, the average thickness of the partition walls is 0.1 to 0.25 mm.

When the thickness of each partition wall is in the above range, low pressure loss can be easily achieved.

The average thickness of the partition walls is the total of the average thickness of the coat layers and the thickness of the substrate portions.

In the honeycomb catalytic converter of the present invention, the shape of the through-holes is not limited to a quadrangular pillar shape. For example, it may be a triangular pillar shape or a hexagonal pillar shape.

In the honeycomb catalytic converter of the present invention, preferably, the density of the through-holes in a cross section perpendicular to the longitudinal direction of the honeycomb catalytic converter is 31 to 155 pcs/cm$^2$.

Preferably, the honeycomb catalytic converter of the present invention has a porosity of 40 to 70%. When the porosity of the honeycomb catalytic converter is in the above range, the honeycomb catalytic converter can exhibit high exhaust gas conversion performance while its strength is maintained.

The porosity of the honeycomb catalytic converter can be measured by a weighing method described below.

(1) The honeycomb catalytic converter is cut in size of 10 cells×10 cells×10 mm to obtain a measurement sample. The measurement sample is ultrasonically washed with deionized water and acetone, and dried in an oven at 100° C. The measurement sample with a size of 10 cells×10 cells×10 mm is a sample that is cut out such that the sample includes outermost through-holes and partition walls defining these through-holes and has a longitudinal length of 10 mm, with 10 through-holes aligned longitudinally×10 through-holes aligned transversely.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample based on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) The actual weight of the measurement sample is measured using an electric balance (HR202i available from A & D).

(6) The porosity of the honeycomb catalytic converter is determined by the following formula.

(Porosity of honeycomb catalytic converter)=100−(actual weight of measurement sample/weight of measurement sample based on assumption that the measurement sample is a completely dense body)×100[%]

The honeycomb catalytic converter of the present invention may include a peripheral coat layer on the outer periphery of the honeycomb fired body.

Preferably, the thickness of the peripheral coat layer is 0.1 to 2.0 mm.

In the honeycomb catalytic converter of the present invention, a noble metal is supported on the honeycomb structured body.

The noble metal is supported on at least the coat layers. The noble metal may be supported on the substrate portions.

Examples of the noble metal include platinum group metals such as Pt, Pd, and Rh.

In the honeycomb catalytic converter of the present invention, the amount of the noble metal supported is preferably 0.1 to 15 g/L, more preferably 0.5 to 10 g/L.

The term "amount of the noble metal supported" as used herein refers to the weight of the noble metal per apparent volume of the honeycomb catalytic converter. The apparent volume of the honeycomb catalytic converter includes the volume of pores and cells, and it includes the volume of the peripheral coat layer and/or the volume of an adhesive layer.

[Method of Producing Honeycomb Catalytic Converter]

Next, a method of producing the honeycomb catalytic converter of the present invention is described.

The method of producing the honeycomb catalytic converter of the present invention may be, for example, a method that includes a supporting step of supporting Rh on a honeycomb fired body produced by the following method, and a coat layer forming step of forming a coat layer containing Pd, CZ particles, and alumina particles on the surface of each partition wall.

(Production of Honeycomb Fired Body)

First, a method of producing a honeycomb fired body is described.

The method of producing a honeycomb fired body may be, for example, a method that includes a molding step of molding a raw material paste containing CZ particles and alumina particles into a honeycomb molded body in which multiple through-holes are arranged longitudinally in parallel with one another with a partition wall therebetween, and a firing step of firing the honeycomb molded body to produce a honeycomb fired body.

(Molding Step)

In the molding step, first, a raw material paste containing CZ particles and alumina particles is prepared.

The types, average particle sizes, and the like of the CZ particles and the alumina particles have been described in the above section [Honeycomb catalytic converter], so that a detailed description is omitted.

The average particle sizes of the CZ particles and the alumina particles used as raw materials of the honeycomb catalytic converter can be determined by a laser diffraction particle size distribution meter (Mastersizer 2000 available from Malvern Panalytical).

Examples of other raw materials used to prepare the raw material paste include inorganic fibers, inorganic binders, organic binders, forming auxiliaries, and dispersion media.

The inorganic fibers may be made of any material. Examples include alumina, silica, silicon carbide, silica alumina, glass, potassium titanate, and aluminum borate. Two or more of these may be used in combination. Of these, alumina fibers are preferred.

The inorganic fibers preferably have an aspect ratio of 5 to 300, more preferably 10 to 200, still more preferably 10 to 100.

Any inorganic binder may be used. Examples include solid's contained in materials such as alumina sol, silica sol, titania sol, sodium silicate, sepiolite, attapulgite, and boehmite. Two or more of these inorganic binders may be used in combination.

Of these inorganic binders, boehmite is preferred. Boehmite is alumina monohydrate with a composition of AlOOH, and has good dispersibility in media such as water. Thus, boehmite is preferably used as an inorganic binder.

Any organic binder may be used. Examples include methyl cellulose, carboxymethyl cellulose, hydroxyethyl cellulose, polyethylene glycol, phenolic resin, and epoxy resin. Two or more of these may be used in combination.

Any pore-forming agent may be used. Examples include acrylic resins, coke, and starch. In the present invention, use of two or more selected from acrylic resins, coke, and starch is preferred.

The pore-forming agent is one that is used to introduce pores into a honeycomb fired body when producing a honeycomb fired body.

Any forming auxiliary may be used. Examples include ethylene glycol, dextrins, fatty acids, fatty acid soaps, and polyalcohols. Two or more of these may be used in combination.

Any dispersion medium may be used. Examples include water, organic solvents such as benzene, and alcohols such as methanol. Two or more of these may be used in combination.

When the CZ particles, alumina particles, alumina fibers, and boehmite are used as the materials of the raw material paste, the proportions of these materials relative to the total solids remaining in the raw material paste after the firing step are preferably as follows: CZ particles: 25 to 75 wt %; alumina particles: 15 to 35 wt %; alumina fibers: 5 to 15 wt %, and boehmite: 5 to 20 wt %.

Preparation of the raw material paste preferably involves mixing/kneading of the raw materials. A device such as a mixer or an attritor may be used for mixing, or a device such as a kneader may be used for kneading.

After a raw material paste is prepared by the above method, the raw material paste is molded into a honeycomb molded body in which multiple through-holes are arranged longitudinally in parallel with one another with a partition wall therebetween.

Specifically, the raw material paste is extrusion-molded into a honeycomb molded body. More specifically, the raw material paste is passed through a die of a specific shape to form a continuous honeycomb molded body having through-holes of a specific shape, and the continuous honeycomb molded body is cut to a specific length, whereby a honeycomb molded body is obtained.

Next, preferably, a dryer such a microwave dryer, a hot-air dryer, a dielectric dryer, a reduced-pressure dryer, a vacuum dryer, or a freeze-dryer is used to dry the honeycomb molded body to produce a honeycomb dried body.

Herein, the honeycomb molded body and the honeycomb dried body before the firing step are also collectively referred to as a "honeycomb molded body".

(Firing Step)

In the firing step, the honeycomb molded body is fired to produce a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb fired body can be produced by the above steps.

Subsequently, the coat layer forming step is performed in which a coat layer containing a noble metal is formed on the surface of each partition wall of the honeycomb fired body. The supporting step of supporting a noble metal on the surface of each partition wall constituting the honeycomb fired body may be performed before the coat layer forming step.

(Supporting Step)

In the supporting step, a noble metal can be supported on the partition walls constituting the honeycomb fired by, for example, a method that includes immersing the honeycomb fired body in a solution containing a noble metal and drying the honeycomb fired body.

(Coat Layer Forming Step)

First, a slurry for forming a coat layer which serves as a raw material of the coat layer is prepared.

The slurry for forming a coat layer can be obtained by mixing CZ particles, alumina particles, and a noble metal-containing material with a solvent.

The noble metal-containing material may be a dispersion of noble metal particles or a solution of a noble metal complex or a noble metal salt.

The order of mixing various raw materials is not limited. In one method, CZ particles, alumina particles, a noble metal-containing material, and a solvent are mixed together at once. In another method, CZ particles and a RH-containing material are first mixed together to obtain noble metal-carrying CZ particles, and subsequently, the noble metal-carrying CZ particles, alumina particles, and a solvent are mixed together. In yet another method, alumina particles and a noble metal-containing material are first mixed together to obtain a noble metal-carrying alumina particles, and subsequently, the noble metal-carrying alumina particles, CZ particles, and a solvent are mixed together.

Examples of other raw materials used to prepare the slurry for forming a coat layer include inorganic binders and dispersion media.

Such other raw materials are preferably those used in the raw material paste to produce a honeycomb molded body.

After the honeycomb fired body is immersed in the slurry for forming a coat layer and removed therefrom, the honeycomb fired body is dried and fired, whereby a coat layer containing a noble metal is formed on the surface of each partition wall constituting the honeycomb fired body.

Here, for example, the viscosity of the slurry for forming a coat layer is adjusted, and the outlet-side end face is immersed in the slurry for forming a coat layer with the inlet-side end face of the honeycomb fired body facing up and the outlet-side end face thereof facing down to suck up the slurry for forming a coat layer from the inlet-side end face by a suction machine or the like. With such a method, the coat layers can be made thinner on the inlet-side end face than on the outlet-side end face. Subsequently, the honeycomb fired body is dried and fired, whereby the honeycomb catalytic converter of the present invention can be obtained.

The total amount of the noble metals supported in the coat layer forming step is preferably adjusted to 0.1 to 15 g/L, more preferably 0.5 to 10 g/L.

(Other Steps)

When a peripheral coat layer is formed on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. The peripheral coat layer paste may have the same composition as that of the raw material paste or the slurry for forming a coat layer.

When a honeycomb structured body in which multiple honeycomb fired bodies are combined together with an adhesive layer therebetween is used as a catalytic converter, such a honeycomb structured body can be produced by applying an adhesive layer paste to the outer periphery of each honeycomb fired body excluding both end faces thereof, combining the honeycomb fired bodies, and solidifying the adhesive layer paste by drying. The adhesive layer paste may have the same composition as that of the raw material paste or the slurry for forming a coat layer.

EXAMPLES

Examples that more specifically disclose the present invention are described below. The present invention is not limited to these examples.

Production of Honeycomb Catalytic Converter

Example 1

The following materials were mixed/kneaded to prepare a raw material paste: CZ particles ($CeO_2$:$ZrO2$=3:7 (weigh ratio) m average particle size: 2 μm) (26.4 wt %), θ-alumina particles (average particle size: 2 μm) (13.2 wt %), alumina fibers (average fiber diameter: 3 μm; average fiber length: 60 μm) (5.3 wt %), boehmite as an inorganic binder (11.3 wt %), methyl cellulose as an organic binder (5.3 wt %), acrylic resin as a pore-forming agent (2.1 wt %), coke also as a pore-forming agent (2.6 wt %), polyoxyethylene oleyl ether (surfactant) as a forming auxiliary (4.2 wt %), and deionized water (29.6 wt %).

Using an extruder, the raw material paste was extrusion-molded into a round pillar-shaped honeycomb molded body. Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body was produced. The honeycomb fired body had a round pillar shape with a diameter of 103 mm and a length of 105 mm in which the density of the through-holes was 77.5 pcs/cm$^2$ (500 cpsi) and the thickness of each partition wall was 0.076 mm (3 mil).

(Supporting of Noble Metal)

A solution of palladium nitrate Pd(NO$_3$)$_2$ in nitric acid (Pd concentration: 100 g/L) was prepared. The honeycomb fired body was immersed and kept in this solution for 24 hours. Subsequently, the honeycomb fired body was removed from the solution, dried at 110° C. for 2 hours, and fired at 500° C. for 1 hour in a nitrogen atmosphere, whereby a Pd-carrying honeycomb fired body in which Pd was supported on the honeycomb fired body was obtained.

The amount of Pd supported was 1.2 g/L per apparent volume of the honeycomb fired body.

(Preparation of Slurry for Forming Coat Layer)

CZ particles (CeO$_2$:ZrO=3:7 (weight ratio), average particle diameter: 2 μm) was added and mixed with a rhodium nitrate solution, and the solvent was dried, followed by firing at 500° C. for 1 hour, whereby Rh-carrying CZ particles in which Rh was supported in the CZ particles were obtained. Subsequently, the Rh-carrying CZ particles (40 parts by weight) were mixed with θ-alumina particles (average particle size: 2 μm) (60 parts by weight), and these particles were mixed with ion-exchanged water (200 parts by weight), whereby a slurry for forming a coat layer was prepared. The slurry for forming a coat layer had a viscosity of 1.4 Pa·s.

(Formation of Coat Layer)

One end face (which defines the outlet-side end face) of the honeycomb fired body was immersed in the slurry for forming a coat layer, and the slurry was sucked from the upper part by a suction machine, whereby the slurry for forming a coat layer was attached to the surface of the Pd-'carrying honeycomb fired body, and coat layers that were thicker on the lower end face (which defines the outlet-side end face) than on the upper end face (which defines the inlet-side end face) were formed. Subsequently, the honeycomb fired body was dried at 80° C. for 24 hours and fired at 500° C. for one hour, whereby a honeycomb catalytic converter according to Example 1 was obtained.

The coat layers each had a thickness of 10 μm on the inlet-side end face and a thickness of 25 μm on the outlet-side end face. The average thickness was 18 μm. Here, the inlet-side end face had an aperture ratio of 83.7% and the outlet-side end face had an aperture ratio of 78.9%.

The amount of Rh supported was 0.4 g/L per apparent volume of the honeycomb catalytic converter.

Comparative Example 1

A honeycomb catalytic converter according to Comparative Example 1 was obtained as in Example 1, except that the viscosity of the slurry for forming a coat layer was changed to 0.7 Pa·s.

The coat layers each had a thickness of 18 μm on both the inlet-side end face and the outlet-side end face. Both the inlet-side end face and the outlet-side end face had an aperture ratio of 81.1%.

Comparative Example 2

A honeycomb catalytic converter according to Comparative Example 2 was obtained by inverting the inlet-side end face and the outlet-side end face of the honeycomb catalytic converter obtained in Example 1. The coat layers each had a thickness of 25 μm on the inlet-side end face and a thickness of 10 μm on the outlet-side end face. The average thickness was 18 μm. The inlet-side end face had an aperture ratio of 78.9%, and the outlet-side end face had an aperture ratio of 83.7%.

(Measurement of Pressure Loss)

Air at room temperature was introduced at 600 m$^3$/hr into the honeycomb catalytic converters according to Example 1 and Comparative Examples 1 and 2 to measure the pressure loss from the pressure difference between the both end faces of each honeycomb catalytic converter.

(Measurement of HC Conversion Performance)

Each of the honeycomb catalytic converters according to Example 1 and Comparative Examples 1 and 2 was set in a V6-3.5 L engine, and the temperature was increased at a rate of 10° C./min from the start of the stoichiometric engine. The temperature at which the HC concentration ((HC inflow-HC outflow)/(HC inflow)×100) was 50% or lower was measured to evaluate the HC conversion performance. Table 1 shows the results.

TABLE 1

| | Inlet-side end face | | Outlet-side end face | | Coat layer | | Evalutaion |
|---|---|---|---|---|---|---|---|
| | Coat layer thickness [μm] | Aperture ratio [%] | Coat layer thickness [μm] | Aperture ratio [%] | average thickness [μm] | Pressure loss [kPa] | HC conversion performance [° C.] |
| Example 1 | 10 | 83.7 | 25 | 78.9 | 18 | 2.4 | 270 |
| Comparative Example 1 | 18 | 81.1 | 18 | 81.1 | 18 | 2.6 | 300 |
| Comparative Example 2 | 25 | 78.9 | 10 | 83.7 | 18 | 3 | 280 |

The results in Table 1 show that the honeycomb catalytic converter of the present invention can achieve low pressure loss. The results also show that the temperature at which the HC concentration is 50% or lower is lower in the honeycomb catalytic converter of the present invention than in the honeycomb catalytic converters according to Comparative Examples 1 and 2, and that the honeycomb catalytic converter of the present invention has excellent exhaust gas conversion performance.

REFERENCE SIGNS LIST 10 honeycomb catalytic converter
10a inlet-side end face
10b outlet-side end face
11 honeycomb structured body
12 through-hole
13 partition wall
13a substrate portion
13b coat layer

The invention claimed is:

1. A honeycomb catalytic converter comprising:
a honeycomb structured body in which multiple through-holes are arranged longitudinally in parallel with one another with a partition wall therebetween;
a noble metal supported on the honeycomb structured body; and
an inlet-side end face and on outlet-side end face,
wherein each partition wall includes a substrate portion in the form of an extrudate containing a ceria-zirconia complex oxide and alumina, and a coat layer formed on a surface of the substrate portion and containing the noble metal,
an aperture ratio of the inlet-side end face is higher than an aperture ratio the outlet-side end face, and
wherein the inlet-side end face has an aperture ratio of 70 to 90%, and the outlet-side end face has an aperture ratio of 65 to 85%.

2. The honeycomb catalytic converter according to claim 1,
wherein a thickness of the coat layer on the outlet-side end face is thicker than the thickness of the coat layer on the inlet-side end face.

3. The honeycomb catalytic converter according to claim 2,
wherein the thickness of the coat layer successively increases from the inlet-side end face toward the outlet-side end face.

4. The honeycomb catalytic converter according to claim 2,
wherein the substrate portion further contains an inorganic binder.

5. The honeycomb catalytic converter according to claim 2,
wherein the honeycomb catalytic converter has a length to diameter ratio (length/diameter) of 0.5 to 1.1.

6. The honeycomb catalytic converter according to claim 2,
wherein the honeycomb catalytic converter has a diameter of 130 mm or less.

7. The honeycomb catalytic converter according to claim 2,
wherein the honeycomb catalytic converter contains 25 to 75 wt % ceria-zirconia complex oxide.

8. The honeycomb catalytic converter according to claim 1,
wherein the thickness of the coat layer successively increases from the inlet-side end face toward the outlet-side end face.

9. The honeycomb catalytic converter according to claim 8,
wherein the substrate portion further contains an inorganic binder.

10. The honeycomb catalytic converter according to claim 8,
wherein the honeycomb catalytic converter has a length to diameter ratio (length/diameter) of 0.5 to 1.1.

11. The honeycomb catalytic converter according to claim 8,
wherein the honeycomb catalytic converter has a diameter of 130 mm or less.

12. The honeycomb catalytic converter according to claim 8,
wherein the honeycomb catalytic converter contains 25 to 75 wt % ceria-zirconia complex oxide.

13. The honeycomb catalytic converter according to claim 1,
wherein the substrate portion further contains an inorganic binder.

14. The honeycomb catalytic converter according to claim 1,
wherein the honeycomb catalytic converter contains 25 to 75 wt % ceria-zirconia complex oxide.

15. A honeycomb catalytic converter comprising:
a honeycomb structured body in which multiple through-holes are arranged longitudinally in parallel with one another with a partition wall therebetween;
a noble metal supported on the honeycomb structured body; and
an inlet-side end face and on outlet-side end face,
wherein each partition wall includes a substrate portion in the form of an extrudate containing a ceria-zirconia complex oxide and alumina, and a coat layer formed on a surface of the substrate portion and containing the noble metal,
an aperture ratio of the inlet-side end face is higher than an aperture ratio the outlet-side end face, and
wherein the honeycomb catalytic converter has a length to diameter ratio (length/diameter) of 0.5 to 1.1.

16. The honeycomb catalytic converter according to claim 15,
wherein the inlet-side end face has an aperture ratio of 70 to 90%, and the outlet-side end face has an aperture ratio of 65 to 85%.

17. A honeycomb catalytic converter comprising:
a honeycomb structured body in which multiple through-holes are arranged longitudinally in parallel with one another with a partition wall therebetween;
a noble metal supported on the honeycomb structured body; and
an inlet-side end face and on outlet-side end face,
wherein each partition wall includes a substrate portion in the form of an extrudate containing a ceria-zirconia complex oxide and alumina, and a coat layer formed on a surface of the substrate portion and containing the noble metal,
an aperture ratio of the inlet-side end face is higher than an aperture ratio the outlet-side end face, and
wherein the honeycomb catalytic converter has a diameter of 130 mm or less.

18. The honeycomb catalytic converter according to claim 17,
wherein the inlet-side end face has an aperture ratio of 70 to 90%, and the outlet-side end face has an aperture ratio of 65 to 85%.

* * * * *